(12) United States Patent
Sun

(10) Patent No.: US 7,538,938 B2
(45) Date of Patent: May 26, 2009

(54) OPTICAL FILTER FOR FLASH LAMPS IN PULSED THERMAL IMAGING

(75) Inventor: Jiangang Sun, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 120 days.

(21) Appl. No.: 11/452,156

(22) Filed: Jun. 13, 2006

(65) Prior Publication Data

US 2007/0285766 A1    Dec. 13, 2007

(51) Int. Cl.
*F21V 9/04*  (2006.01)
*G01N 25/72*  (2006.01)
*G01B 5/16*  (2006.01)

(52) U.S. Cl. .......................... 359/359; 359/361; 374/7; 702/172

(58) Field of Classification Search ......... 359/350–361, 359/885–892, 577–590; 374/5, 7
See application file for complete search history.

(56) References Cited

U.S. PATENT DOCUMENTS

| | | | | |
|---|---|---|---|---|
| 4,315,186 A | * | 2/1982 | Hirano et al. ................ 313/111 |
| 4,504,553 A | * | 3/1985 | Aubert et al. ................ 428/622 |
| 4,663,557 A | * | 5/1987 | Martin et al. ................ 313/112 |
| 4,792,683 A | * | 12/1988 | Chang et al. ............. 250/341.6 |
| 5,360,659 A | * | 11/1994 | Arends et al. ................ 428/216 |
| 6,394,646 B1 | * | 5/2002 | Ringermacher et al. ......... 374/7 |
| 6,517,236 B2 | | 2/2003 | Sun et al. ........................ 374/4 |
| 6,542,849 B2 | | 4/2003 | Sun .............................. 702/172 |
| 6,712,502 B2 | * | 3/2004 | Zalameda et al. .............. 374/5 |
| 7,409,313 B2 | * | 8/2008 | Ringermacher et al. ..... 702/172 |

OTHER PUBLICATIONS

G. Busse, D. Wu, and W. Karpen, 1992, "Thermal Wave Imaging with Phase Sensitive Modulated Thermography," J. Appl. Phys., vol. 71, pp. 3962-3965.
J.I. Eldridge et al., 2003, "Health Monitoring of thermal barrier coatings by mid-infrared reflectance," in Ceramic Eng. Sci. Proc., vol. 24, Issue 3, pp. 511-516.
H.I. Ringermacher et al., 2004, "Flash-Quenching for High Resolution Thermal Depth Imaging," in Review of Quantitative Nondestructive Evaluation, vol. 23, pp. 477-481.
J.G. Sun and J. Benz, 2004, "Flash Duration Effect in One-Sided Thermal Imaging," in Review of Progress in Quantitative Nondestructive Evaluation, vol. 24, pp. 650-654.
J.G. Sun and S. Erdman, 2003, "Effect of Finite Flash Duration on Thermal Diffusivity Imaging of High-Diffusivity or Thin Materials," in Review of Progress in Quantitative.
W.P. Winfree and J.N. Zalamenda, 2002, "Single Sided Thermal Diffusivity Imaging with a Shuttered Thermographic Inspection System," in Review of Quantitative.

* cited by examiner

*Primary Examiner*—Thong Nguyen
(74) *Attorney, Agent, or Firm*—Joan Pennington

(57) ABSTRACT

An optical filter made from a borosilicate optical material is provided for flash lamps used in pulsed thermal imaging. The filter substantially eliminates the infrared radiation from flash lamps to allow for accurate detection of surface temperature during entire pulsed thermal imaging tests.

13 Claims, 13 Drawing Sheets

OPTICAL FILTER FOR FLASH LAMPS IN PULSED THERMAL IMAGING

The United States Government has rights in this invention pursuant to Contract No. W-31-109-ENG-38 between the United States Government and Argonne National Laboratory.

FIELD OF THE INVENTION

The present invention relates to an optical filter for flash lamps used in pulsed thermal imaging.

DESCRIPTION OF THE RELATED ART

Pulsed thermal imaging is widely used for nondestructive evaluation (NDE) of advanced materials and components. The premise is that the flow of heat from the surface of a solid is affected by internal flaws such as disbonds, voids or inclusions. In pulsed thermal imaging, optical radiation (visible light) is used to heat the surface of the sample, and an infrared camera to detect changes in the surface temperature as the surface cools. Material properties or flaws within the sample can be derived from the measured surface temperature data during and after the pulsed heating. Photographic flash lamps are the most commonly used pulsed radiative sources for thermal heating of the test-sample's surface, and most NDE systems use mid-wavelength (3-5 μm) infrared cameras (some use long-wavelength 8-14 μm infrared cameras).

For photographic flash lamps, the flash energy is mostly concentrated in the visible spectrum (0.4-0.75 μm). However, they also emit a significant amount of energy in the infrared spectrum. This infrared radiation can be reflected by the test-sample surface back to the infrared camera.

Because the infrared radiation from the flash lamps can be several orders of magnitude higher than that emitted from the sample surface, even a small amount of flash radiation reflected into the camera will make the detector signal to be not representative of the real surface temperature.

Infrared radiation from flash lamp is a major hardware problem in one-sided pulsed thermal imaging. However, this has not been of significant concern for most thermography users because most applied for NDE detection of large/severe defects (e.g., delaminations) in slow transient materials such as polymer matrix composites. Thermal transient times for these materials are typically long, more than 5 to 10 seconds. For metals and many advanced materials such as ceramic composites and thermal barrier coatings (TBCs), which consists of a top ceramic coat, a bond coat, and a metallic substrate, thermal transient time ranges from a few seconds to tens of milliseconds or shorter. Pulsed thermal imaging is not reliable (or cannot be used) to test these materials. Current practice is to apply a black paint on sample surface to increase surface emission and reduce the reflection of infrared radiation from the flash lamps. This practice is not desirable for some materials such as TBCs.

This problem has been recognized in the 1970's. In early studies, water was used to "filter" the infrared radiation because it has significant absorption in several bands of infrared wavelengths. For example, water has been used to filter infrared radiation for modulated thermography. However, water is not an efficient filtering medium for the wavelengths used in the state-of-the-art infrared cameras because these cameras are designed for remote sensing so they must avoid the water (moisture) absorption bands to achieve long-distance imaging capability.

A recently developed mechanical shutter device by NASA is used to block the infrared camera during the flash and block the flash lamps after the flash. This mechanical shutter device consists of three shutters for a typical system with two flash lamps: one shutter for the infrared camera, and two shutters for the two flash lamps. The device is operated in three steps during a pulsed thermal imaging test. (1) Before the flash: the camera shutter is opened so the camera can take several initial images. (2) During the flash: the lamp shutters are opened to allow for flash heating of the sample surface and the camera shutter is closed to prevent camera saturation. (3) After the flash: the camera shutter is opened to take thermal images and lamp shutters are closed to eliminate the residual-heat radiation. This device, besides its complex operation procedure, does not allow the camera to take image data during the flash period, but it does eliminate residual heating problem.

An electronic quenching device has been recently developed by Ringermacher et al. of General Electric Company to terminate the decay electric current to the flash lamp so flash duration can be significantly reduced to before taking the first image. The device can produce controllable flash duration, and a short duration of 2.5 ms was demonstrated, and shorter durations can also be obtained. However, reducing the flash duration will also reduce the flash power; the demonstrated 2.5-ms flash retains only about 50% power of the full flash. In addition, this device does not allow for thermal imaging during the flash period and, since the flash tube is still hot after current is cut off, residual-heat radiation still remains.

Thus, none of the attempts to control radiation from the flash lamp has proven to be totally effective.

A principal aspect of the present invention is to provide an optical filter for flash lamps used in pulsed thermal imaging.

Other important aspects of the present invention are to provide such an optical filter for flash lamps used in pulsed thermal imaging substantially without negative effect and that overcome some of the disadvantages of prior art arrangements.

SUMMARY OF THE INVENTION

In brief, an optical filter is provided for flash lamps used in pulsed thermal imaging. The optical filter covers a flash lamp and allows visible wavelength to penetrate while blocking infrared wavelengths that are sensitive to an infrared camera. The filter substantially eliminates the infrared radiation from flash lamps to allow for accurate detection of surface temperature during pulsed thermal imaging tests.

In accordance with features of the invention, the filter is made from a borosilicate optical material. For example, one such material has been identified where a 6.5 mm thick optical window provided an optical transmission of greater than 92% in the visible wavelengths, and less than 2.5% in the infrared 3-5 micron wavelengths.

In accordance with features of the invention, the filter is made from a stack of multiple plates, for example, a stack of 6 plates can reduce the infrared radiation from a flash by greater than 9 orders of magnitude, while the flash energy in the visible wavelengths is decreased by about only ~40%.

In accordance with features of the invention, the filter allows for the complete data obtained in a thermal imaging test to be usable and accurate, without errors introduced by flash reflection effect and residual heating effect.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
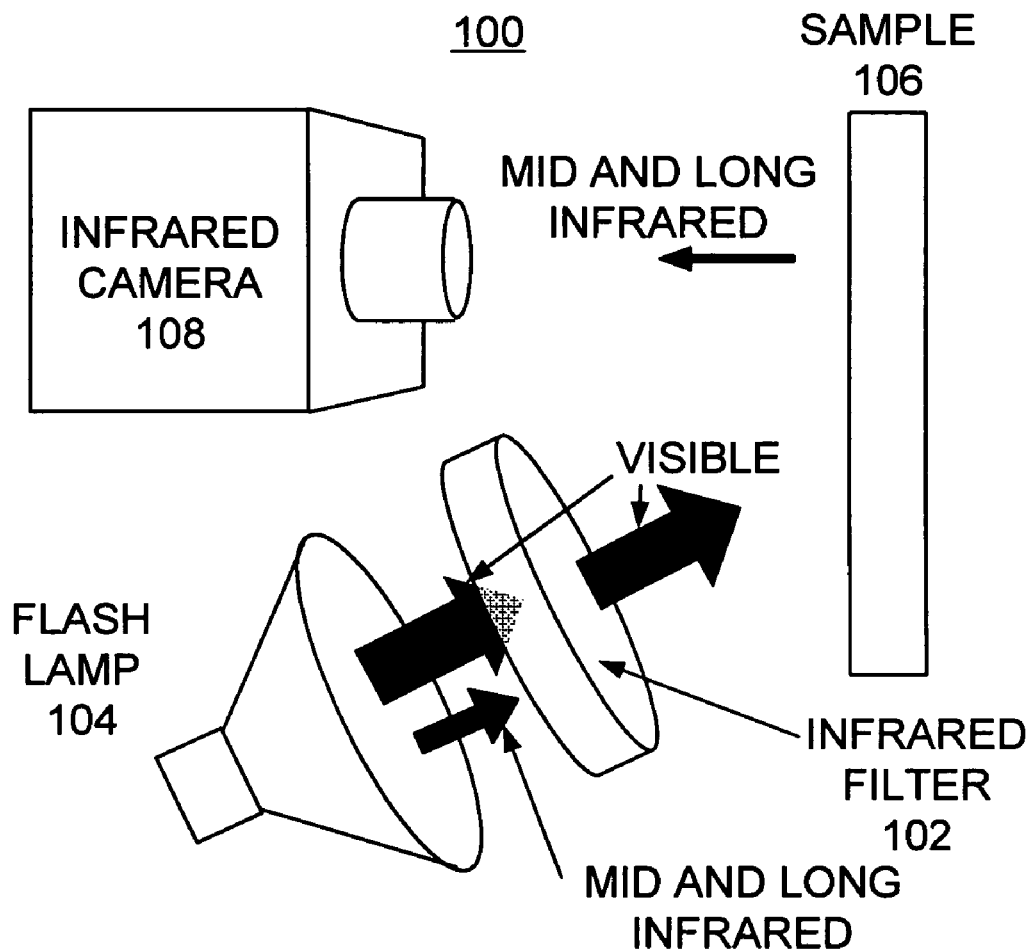
FIG. 1 is a diagram illustrating a thermal imaging apparatus including an invented infrared filter in accordance with the preferred embodiment.

Having reference now to the drawings, FIG. 1 illustrates a pulsed thermal imaging apparatus generally designated by the reference numeral 100 including an invented infrared filter 102 in accordance with the preferred embodiment. Thermal imaging system 100 includes a flash lamp 104 providing a pulse of thermal energy for heating a first surface of the sample 106. Thermal imaging system 100 includes, for example, a high-resolution and high-sensitivity infrared camera 108, for example, with 256×256 pixel focal plane array of infrared sensors. Infrared camera 108 is positioned on the same side of the sample 102 as the flash lamps 104.

In accordance with features of the invention, the infrared filter 102 in accordance with the preferred embodiment substantially eliminates mid and long infrared radiation from the flash lamp 104 so that substantially only a visible light pulse is applied to the sample 106.

Emission of thermal radiation in pulsed thermal imaging can be estimated based on blackbody emission. All substance having a temperature above absolute zero degree (0K) emits electromagnetic radiation. The intensity of emitted radiation is a function of wavelength. For blackbody emission, the spectral intensity i is expressed as:

$$i = \frac{2hc^2}{\lambda^5 (e^{hc/\lambda kT} - 1)}$$

where $\lambda$ is wavelength, T is absolute temperature, c is speed of light, h is Planck constant, and k is Boltzmann constant. The total emitted intensity I (or power) is the integration of the above equation in the entire wavelength: $I=\sigma T^4$, where $\sigma$ is the Stefan-Boltzmann constant.

Thermal radiation is considered to be those with wavelengths from slightly ultra-violet at ~0.3 μm to long infrared wavelength of ~1000 μm. In the following, the blackbody radiation is used for a conservative estimation of the thermal radiation emitted from sample surface 106 and flash lamps 104.

Considering radiation emission and reflection by surface, a surface of a material emits thermal radiation. Its ability to emit radiation at a wavelength is represented by the spectral emissivity $\epsilon$, which is the ratio of the surface emission intensity to the blackbody emission intensity. For incident radiation, the surface may absorb, reflect, and transmit the incident radiation. The spectral absorptivity $\alpha$, reflectivity $\rho$, and transmissivity $\tau$ of the surface are related by: $\alpha+\rho+\tau=1$. By definition, emissivity is equal to absorptivity, or $\epsilon=\alpha$. If the surface is considered to be a blackbody surface, $\epsilon$ is unity and reflectivity, and transmissivity, is zero. For simplicity, in the following discussions no distinction is made between the spectral and the wavelength-averaged properties except explicitly described.

Most engineering materials can be considered opaque ($\tau=0$) with wide range of emissivity and reflectivity values. For metals, depending on surface condition, emissivity is typically in the range of 0.05-0.3; therefore, their surface reflectivity can be an order of magnitude higher than surface emissivity. For opaque nonmetals, the emissivity is typically >0.8 (most black surfaces have emissivity >0.95); therefore, their surface reflectivity is an order of magnitude lower than surface emissivity. However, many oxide ceramics including thermal barrier coatings (TBCs) are translucent, their emissivity is comparable to the reflectivity.

Typically photographic flash lamps 104 are designed for illumination in optical photography, their emitted intensity, or power, is mostly concentrated in the visible wavelengths, such as in a range of 0.4-0.75 μm. This requires the flash medium to be excited to a high temperature, for example, ~6000K. For a typical commercial flash lamp 104, such as manufactured and sold by BALCAR, France, its radiation spectrum is closely matched with the blackbody emission at 5850K.

In pulsed thermal imaging apparatus 100, the flash-lamp radiation in the visible spectrum is used to heat the sample surface, while that in the infrared spectrums advantageously is not used. On the other hand, the surface of the test sample is near room temperature (~300K) during most times in pulsed thermal imaging. The detector signal, therefore, contains two components: (1) the thermal radiation emitted from sample surface which is the real signal and can be approximated as the product of surface emissivity and blackbody radiation at ~300K and, (2) the reflected thermal (infrared) radiation from the flash lamp that can be approximated by the product of surface reflectivity and blackbody radiation at ~5850K; this component contributes to measurement error and it can be several orders of magnitude higher than the real signal. Therefore, for thermal imaging it is desirable that the sample surface has a high emissivity and low reflectivity.

Figure 2:
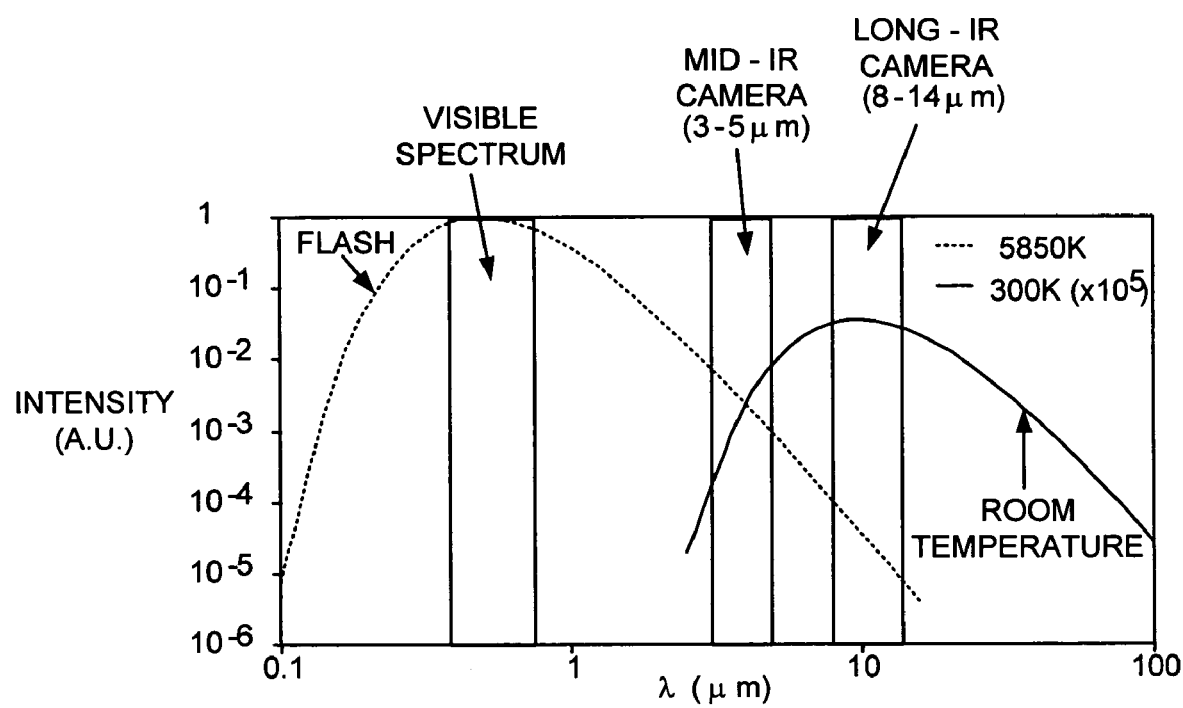
FIG. 2 is a graph illustrating blackbody thermal-radiation spectrums at various temperatures, at 5850K (flash lamp source) and 300K (sample surface) in accordance with the preferred embodiment.

FIG. 2 shows blackbody thermal-radiation spectrums at 5850K (flash lamp source) and 300K (sample surface). The intensity of the two spectrums is scaled to 1 at the maximum of the 5850K spectrum, and a factor of $10^5$ was multiplied to the spectrum from 300K to facilitate examination. FIG. 2 also illustrates the ranges of visible, mid-infrared and long-infrared wavelengths. It is seen that the intensity of infrared radiation in the 3-5 μm wavelengths from the flash lamp is about 5 orders of magnitude higher than that from the sample tested at room temperature. Therefore, even a small amount of flash infrared radiation that is reflected by the sample surface to the infrared camera 108 will overwhelm the camera reading, so the measured data will not be representative of the real surface temperature.

The two spectrums in FIG. 2 also indicate that, for long-infrared-wavelength (8-14 μm) range, the infrared radiation from a flash lamp is only 2 orders of magnitude higher than that from a room temperature surface. Therefore, flash infrared radiation is of less significant when thermal imaging using a long-wavelength infrared camera.

When thermal imaging using an infrared camera, the detector signal should contain less than 1% of the reflected infrared radiation from flash lamps so it represents the real surface temperature. Based on the above estimations on flash and surface radiation intensities and on surface emission/reflection properties, it is estimated that, for thermal imaging using a mid-wavelength infrared camera, the flash infrared radiation should be reduced by a factor of $10^6$ for opaque nonmetals and $10^8$ for metals and oxide ceramics. Using a long-wavelength infrared camera, the flash infrared radiation should be reduced by a factor of $10^3$ for opaque nonmetals and $10^5$ for metals and oxide ceramics.

In addition to the spectral characteristics, photographic flash lamps are also designed to have a short flash duration. The flash intensity typically rises very quickly (<0.1 ms), but decays slowly (several milli-seconds). By neglecting the rise time, the flash intensity decay can be closely modeled by an exponential decay of the form: $I(t)=Ae^{-2t/\tau}$, where A is a constant and $\tau$ is a characteristic flash duration.

Figure 3:
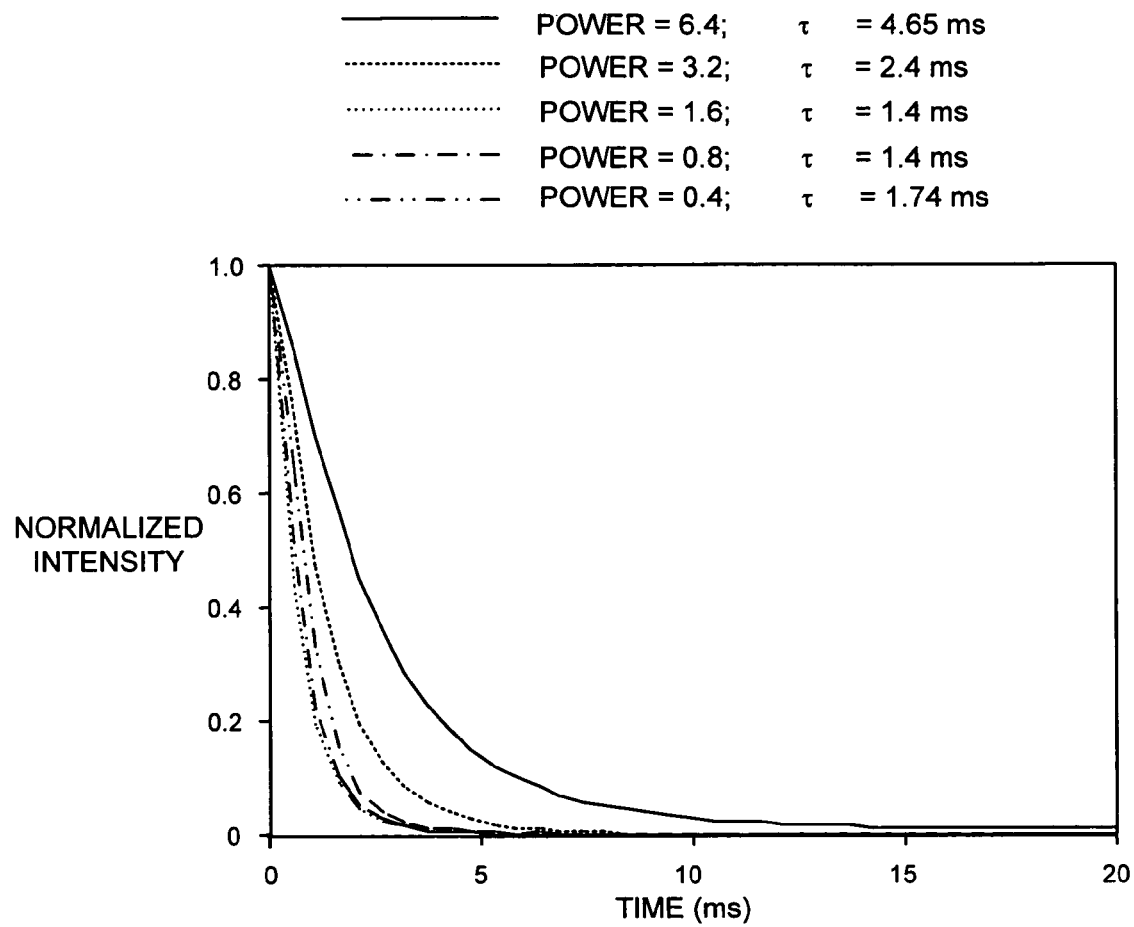
FIG. 3 is a graph illustrating measured flash intensity decay for a flash lamp at various flash-power settings in accordance with the preferred embodiment.

FIG. 3 shows measured flash intensity decay for a flash lamp at various flash-power settings. It is seen that radiation energy can last up to ~15 ms. After the active flash, the flash tube is still hot (possibly hundreds of degrees), so a relatively weaker infrared radiation (residual heat) may still present for up to several seconds.

Figure 4A:
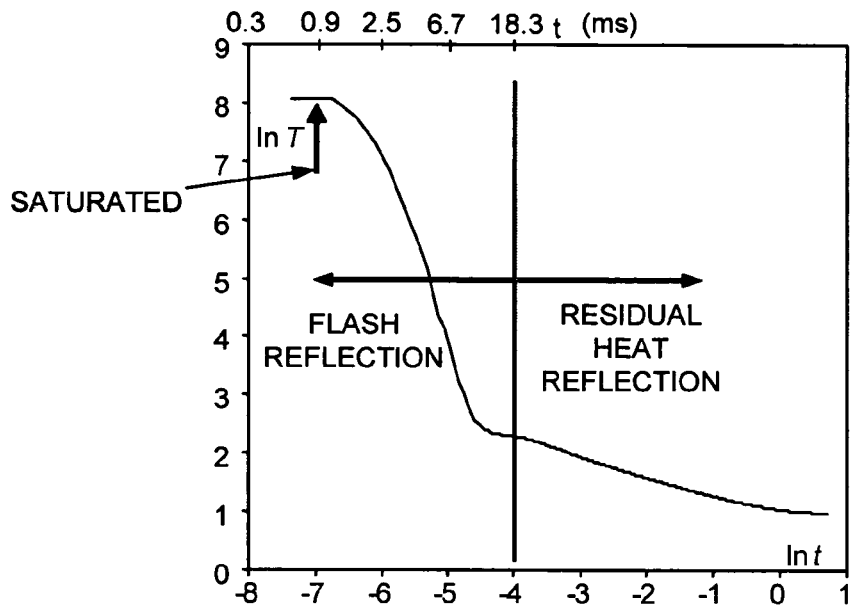
FIGS. 4A and 4B are graphs illustrating typical one-sided pulsed-thermal-imaging result measured by a mid-wavelength infrared camera for a stand-alone TBC specimen and illustrating effect of infrared reflection from flash lamp on measured surface "temperature" and "temperature slope" in log-log scale for a stand alone TBC specimen in accordance with the preferred embodiment.
Figure 4B:
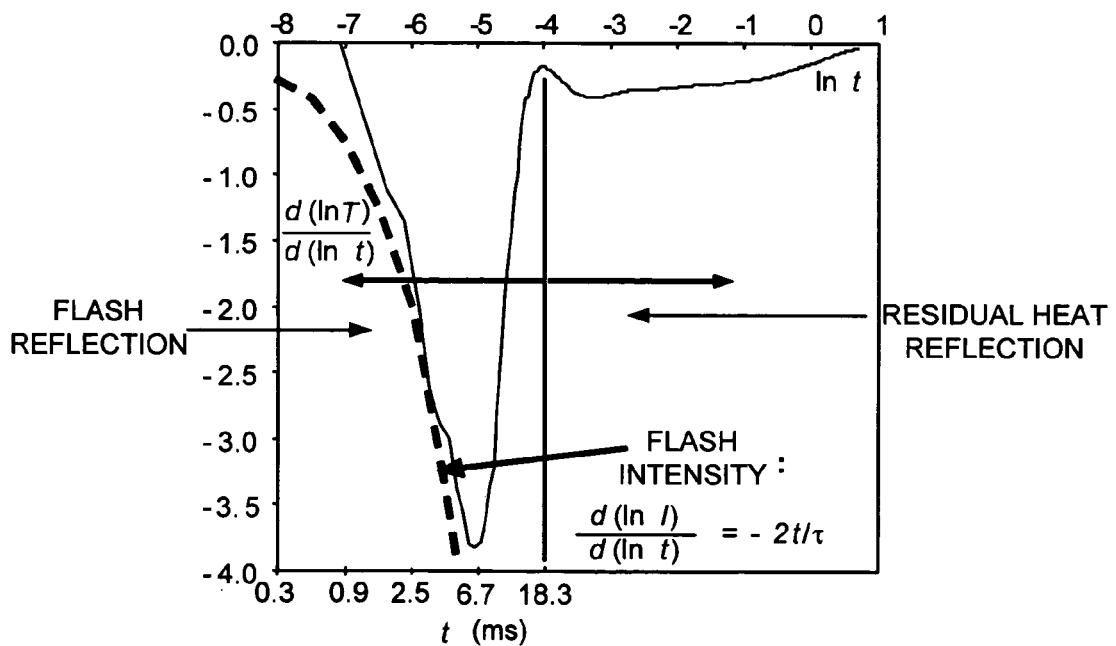

FIGS. 4A and 4B show a conventional one-sided pulsed-thermal-imaging result measured by a mid-wavelength infrared camera for a stand-alone TBC specimen. It is seen that the measured "temperature" T in the initial (flashing) period drops rapidly, which is closely matched by the flash decay curve ($I=Ae^{-2t/\tau}$) as indicated in the temperature slope d(InT)/d(Int) plot of FIG. 4B. From theory, the magnitude of temperature slope |d(InT)/d(Int)| should be lower than 0.5 during the entire transient for the TBC sample, while it peaks to ~3.8 in the measured "data." Therefore, the measured "surface temperature" in the flash period comes entirely from the reflected infrared radiation from the flash lamp. After the active flash was finished at ~18 ms, the data are still not typical for a TBC plate sample as predicted from theory. This set of data, therefore, illustrates the significance of the reflection of infrared radiation from the active flash and from the residual heat in the flash tubes. The residual heat effect appears ended (i.e., the slope becomes zero) at Int=0, or at t=1 s; this was because that the flash lamp was partially covered by an infrared filtering glass in this test. Had the glass not been used, the residual heating would last longer, as to be demonstrated in the following examples (the 0-window curves in FIGS. 7A and 7B and FIGS. 9A and 9B). In general, detector signal in shorter times, such as within flash duration <18 ms, is dominated by reflected infrared radiation from the active thermal flash and that in the intermediate time, within a few seconds, contains a significant component of reflected residual heat from hot flash tubes.

Infrared radiation from flash lamp is a major hardware problem in one-sided pulsed thermal imaging. However, this has not been of significant concern for most thermography users because most applied for NDE detection of large/severe defects (e.g., delaminations) in slow transient materials such as polymer matrix composites. Thermal transient times for these materials are typically long, more than 5 to 10 seconds. For metals and many advanced materials such as ceramic composites and TBCs, thermal transient time ranges from a few seconds to tens of milliseconds or shorter. Pulsed thermal imaging is not reliable (or cannot be used) to test these materials. Current practice is to apply a black paint on sample surface to increase surface emission and reduce the reflection of infrared radiation from the flash lamps. This practice is not desirable for some materials such as TBCs.

In accordance with features of the invention, optical filter 102 is placed in front of the flash lamp 104 that allows visible wavelength to penetrate while blocking infrared wavelengths that are sensitive to the infrared camera 106. Use of such an infrared filter 102 is the only simple, low-cost, and efficient solution to remove infrared radiation from high-power flash lamps. The efficiency of an infrared filter 102 in a thermal imaging system 100 is determined from the product of the detector sensitivity, the filter transmission, and the radiation spectrum.

In accordance with features of the invention, based on above estimations, the filter 102 is required to reduce at least 6-8 orders of magnitude of infrared radiation intensity. Such filter 102 advantageously is made from borosilicate optical material (although more efficient filter materials exist with higher costs). One such material, BOROFLOAT™ Borosilicate Windows (Edmonds Industrial Optics, N.J.), has been identified. Also filter 102 can be made from commercially available heat absorbing glass (Schott KG-series) and IR-Cut filter, and the like. Further filter 102 can be made from another generic material, sapphire, for example, used to filter the long-IR wavelength in 8-14 microns.

Figure 5:
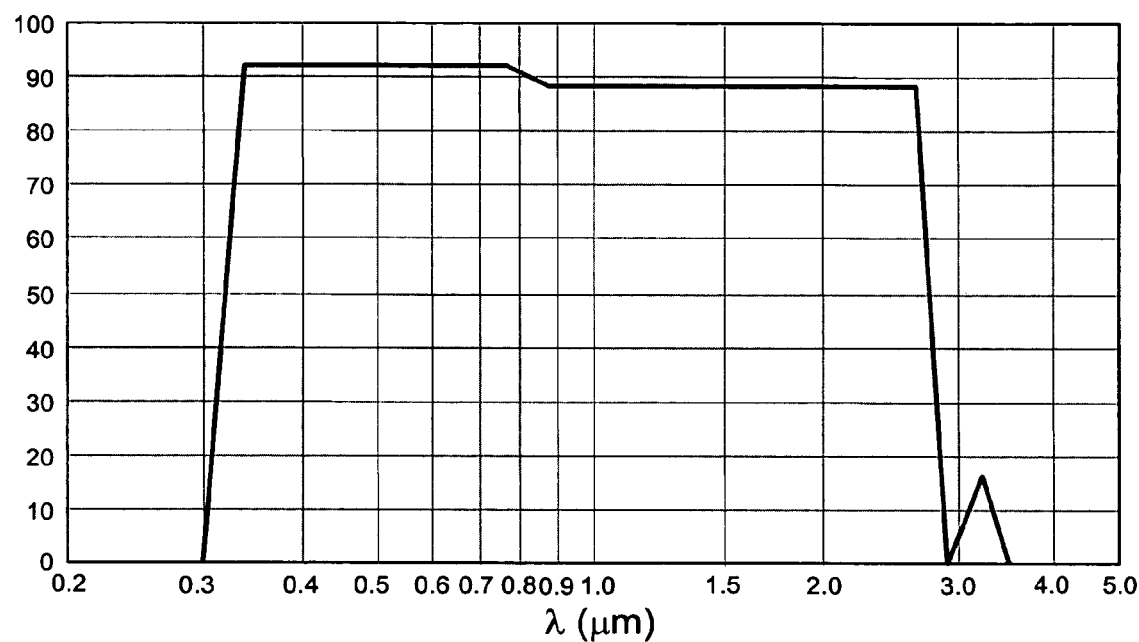
FIG. 5 is a graph illustrating the transmission characteristics of a 6.5-mm-thick borosilicate window in accordance with the preferred embodiment.

FIG. 5 illustrates the transmission characteristics of a 6.5-mm-thick borosilicate window. Optical transmission in two wavelength ranges is most important to thermal imaging: the visible wavelength range in 0.4-0.75 μm (for sample heating) and the mid-infrared wavelength range in 3-5 μm (that should be extincted by the filter). FIG. 5 indicates that the borosilicate window has a high transmission ~92% in the visible wavelengths. The transmission curve in the mid-infrared range is conservatively approximated as a triangular shape: with a peak of ~17% at 3.24 μm that drops to zeros at 2.9 μm and 3.5 μm on the two sides. When averaged in the mid-infrared 3-5 μm wavelengths that are sensitive to the infrared camera 108, the average transmission is <2.5%. Therefore, the borosilicate window has the desired optical properties to construct an infrared filter 102 for thermal imaging. The borosilicate window has high transmission in the visible wavelengths and high attenuation in the mid-infrared wavelengths. In addition, borosilicate window is heat and thermal shock resistant, and has a generally low cost.

A single borosilicate window provides less than 2 orders of magnitude in reduction of infrared radiation. When several windows are stacked as an infrared filter, the filter can essentially extinct the infrared radiation from a flash lamp.

Figure 6:
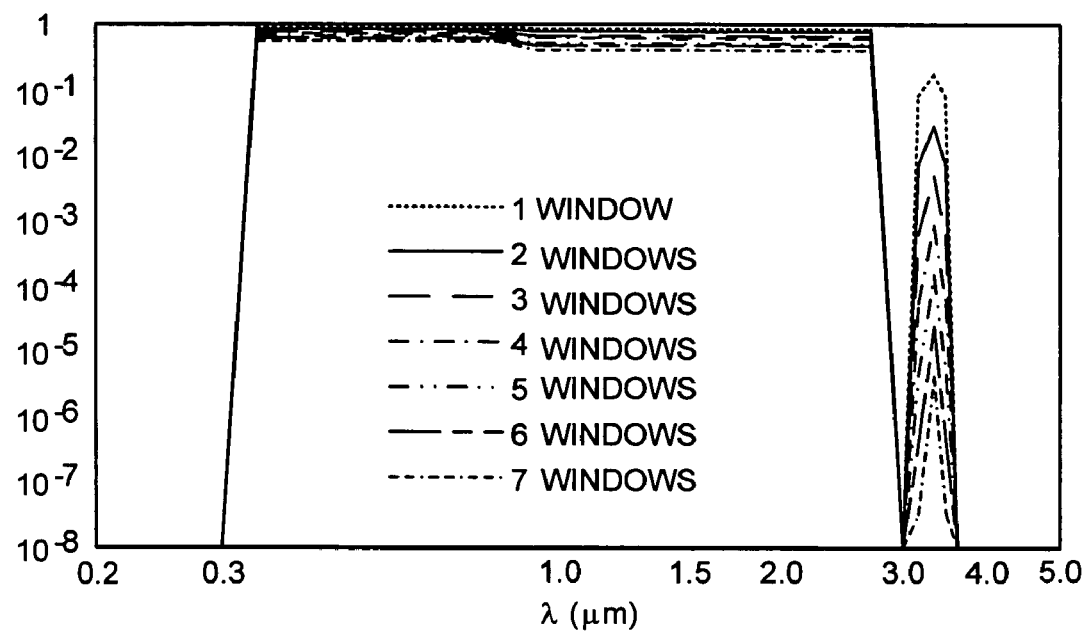
FIG. 6 is a graph illustrating the optical transmission spectrum of infrared filters made from 1 to 7 borosilicate windows in accordance with the preferred embodiment.

FIG. 6 shows the optical transmission spectrum of infrared filters 102 made from 1 to 7 borosilicate windows. Note that the minimum transmission value of zero is set to $10^{-8}$ to facilitate the plot. The averaged transmissions in the visible and mid-infrared wavelengths for these filters are listed in Table 1. It is seen that an infrared filter 102 with 6 borosilicate windows can reduce the mid-infrared radiation by >9 orders of magnitude, while the flash energy in the visible wavelengths is decreased by only ~40%. Most importantly, this filter will allow for thermal imaging of a sample surface in both during and after the flash period to obtain complete and accurate data, without errors introduced by flash reflection effect and residual heating effect.

This infrared filter 102 advantageously is used for thermal imaging with long-wavelength infrared cameras 108. Based on the filtering concept, other new filter materials may be found which could provide even better transmission/extinction performance for thermal imaging applications in various wavelengths.

TABLE 1

Average transmission in visible and infrared ranges for infrared filters with 1 to 7 borosilicate windows.

| No. of windows | Visible (0.4-0.75 μm) | Infrared (3-5 μm) |
|---|---|---|
| 1 | 0.92 | $<2.5 \times 10^{-2}$ |
| 2 | 0.846 | $6.3 \times 10^{-4}$ |
| 3 | 0.779 | $1.6 \times 10^{-5}$ |
| 4 | 0.716 | $3.9 \times 10^{-7}$ |
| 5 | 0.659 | $9.8 \times 10^{-9}$ |
| 6 | 0.606 | $2.4 \times 10^{-10}$ |
| 7 | 0.558 | $6.1 \times 10^{-12}$ |

The performance of the infrared filter 102 is evaluated for 3 materials: graphite, TBC, and metal. These materials have wide range of reflectivity representing most, if not all, important engineering materials. Pulsed thermal imaging tests were conducted using a mid-infrared-wavelength (3-5 μm) camera at an imaging speed of 1900 Hz. The flash lamp 104 has a short flash duration of τ=1.1 ms. For example, 2000 thermal images were taken in each test. The acquired surface temperature data were plotted in log-log format to facilitate examination of the amount of infrared reflection from the flash lamps and, therefore, to determine the performance of the filters.

Figure 7A:
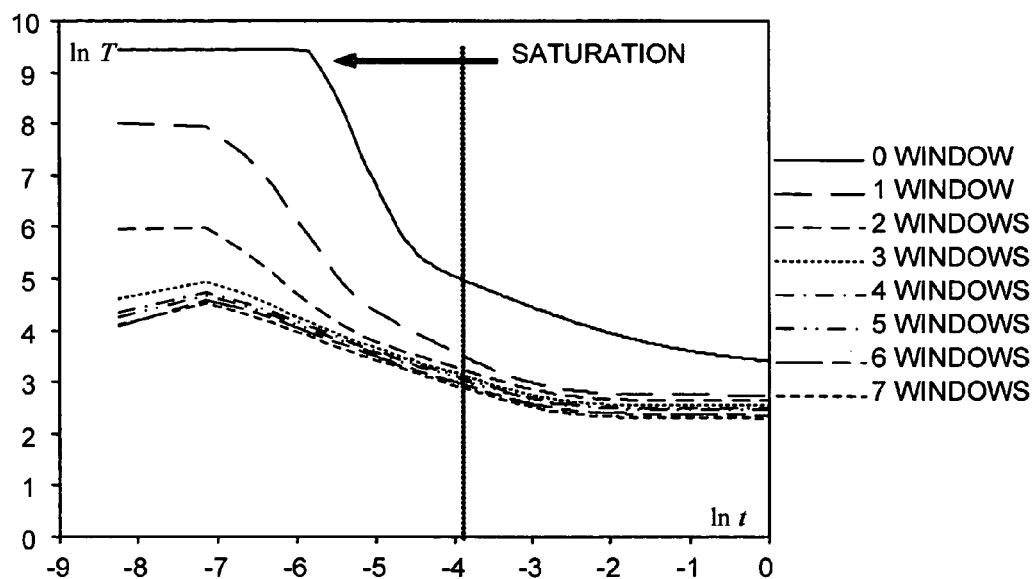
FIGS. 7A and 7B are graphs illustrating the effect of using infrared filters made from up to 7 borosilicate windows on measured surface temperature InT and temperature slope d(InT)/d(Int) as functions of time for a graphite sample in accordance with the preferred embodiment.
Figure 7B:
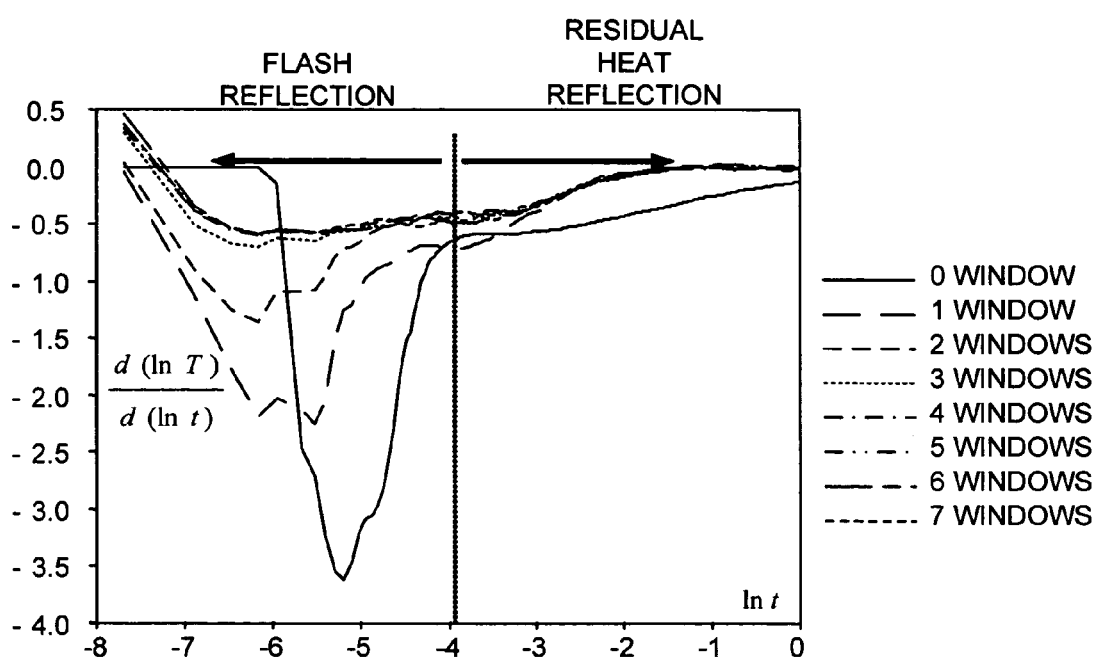

The first sample is a round graphite plate of 1-inch diameter and 4 mm thick. Graphite is black and opaque and has a low reflectivity of <10%. FIGS. 7A and 7B show the effect of using infrared filters made from borosilicate windows on measured surface temperature and temperature slope as functions of time in log-log scale. It is seen that, without a filter (0 window), the measured "temperature" is very high and saturated in the flash period, with a high "temperature" decay rate (high magnitude of the temperature slope). This curve is not representative of the real surface temperature. By comparing the 0-window curve to those obtained with filters, it is evident that the measured "temperature" comes entirely from the flash reflection in early times (<18 ms), and is dominated by the reflection of residual heat from hot flash tubes in the later times (>1 s). When using an infrared filter made with 2 borosilicate windows, the temperature slope d(InT)/d(Int) does not change further with additional windows after the time t>18 ms (Int>−4). This indicates that the residual heat effect has been removed. When using an infrared filter made with 4 or more borosilicate windows, the temperature-slope curves converge to the same curve in the entire test period, including that within the flash duration. These results demonstrate that an infrared filter made with 4 borosilicate windows can reduce the infrared radiation from flash lamps to a sufficiently low intensity that its reflection by a black-opaque surface does not affect the detection of the emitted infrared radiation from the same surface. From Table 1, a filter 102 with 4 borosilicate windows transmits 71% of visible light energy that is used for sample heating, and $<4\times10^{-7}$ of mid-infrared-wavelength (3-5 μm) radiation which is the source of camera saturation and data inaccuracy.

For measured temperature in FIGS. 7A and 7B, addition of each window causes an 8% reduction in temperature magnitude; this is because each window transmits 92% of the visible light for surface heating, or an 8% attenuation.

Measured thermal imaging data using an infrared filter made from 4 borosilicate windows can be demonstrated to be the real surface temperature from the pulsed thermal imaging test. This is done by comparing the measured data with theoretical predictions. For opaque plate sample, and accounting for the flash duration effect, theoretical solution of the surface temperature response during pulsed thermal imaging has been obtained.

Figure 8:
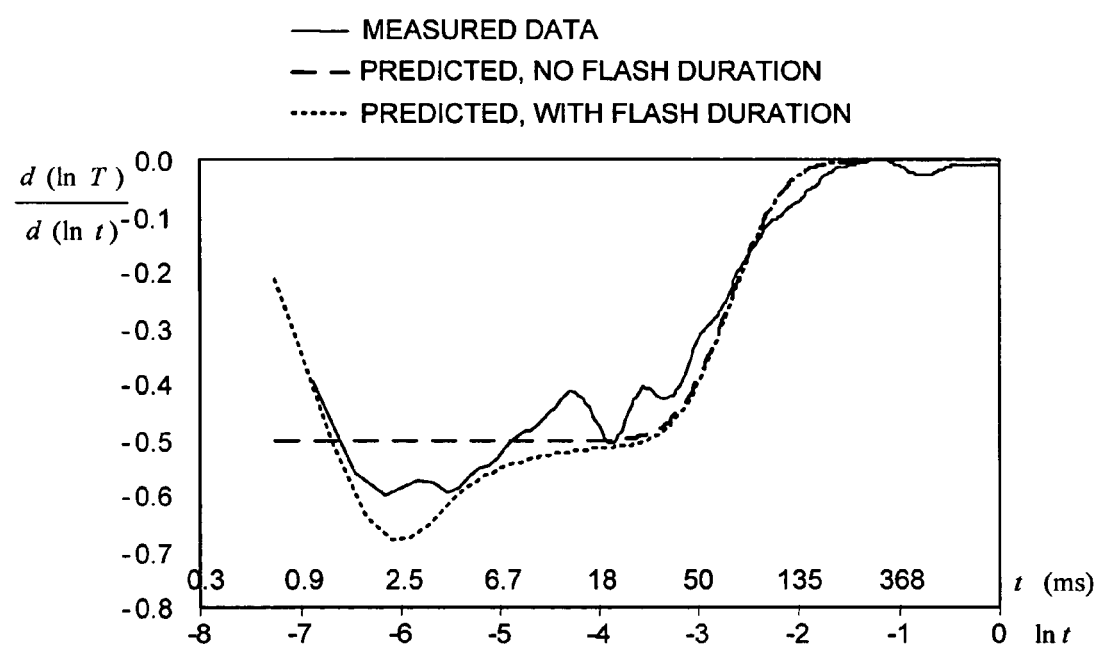
FIG. 8 is a graph illustrating the comparison of the measured temperature-slope data with theoretically predicted results in accordance with the preferred embodiment.

FIG. 8 illustrates a comparison of theoretical predictions and measured data obtained using an infrared filter made from 4 borosilicate windows for a graphite sample. It is seen that, although some noises present in the experimental data, measured data match very well with the theoretical prediction. In particular, the measured data exhibit a temperature-slope peak at 2.5 ms that is predicted by the theory; this peak time is related to the flash duration τ.

The second sample is a TBC material, with a 1.2-mm-thick TBC coating and a 2.5-mm-thick metallic substrate. TBC is a translucent material with a high reflectivity, in the order of 50%.

Figure 9A:
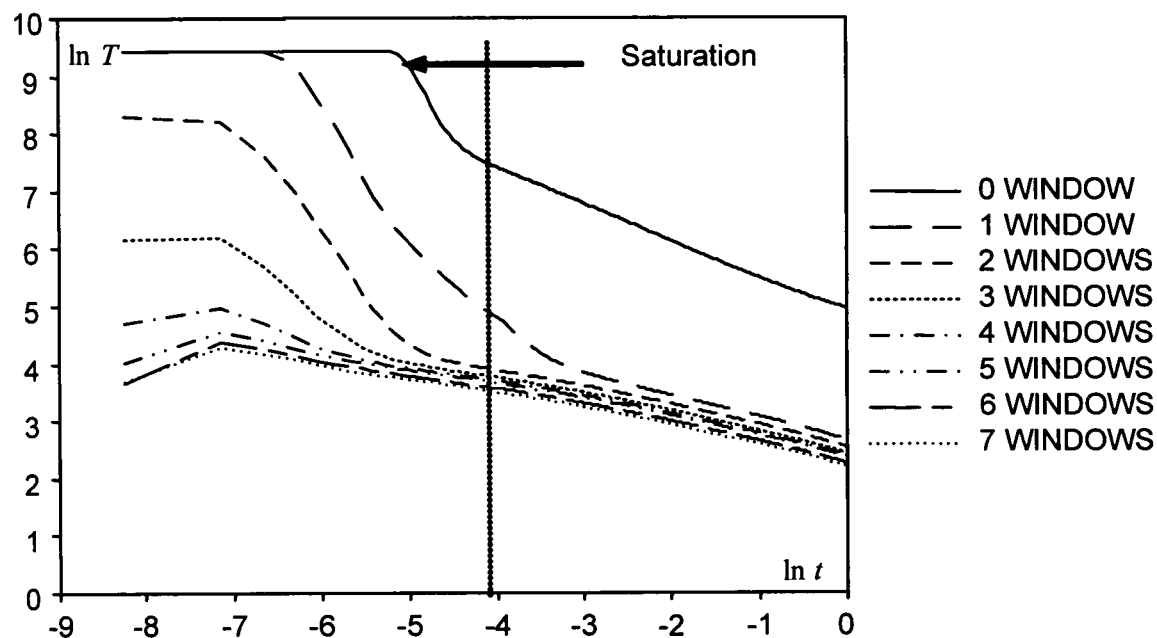
FIGS. 9A and 9B are graphs illustrating the effect of using infrared filters made by borosilicate windows on measured surface temperature and temperature slope as functions of time in log-log scale for a TBC sample in accordance with the preferred embodiment.
Figure 9B:
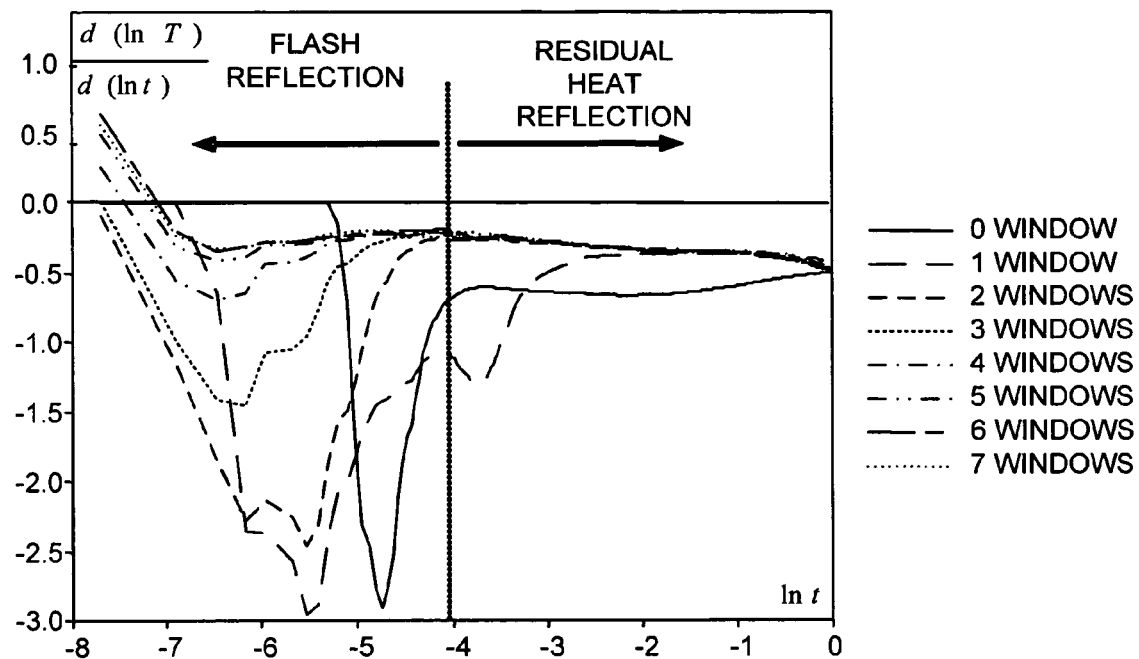

FIGS. 9A and 9B show the effect of using infrared filters made by borosilicate windows on measured surface temperature and temperature slope as functions of time in log-log scale. In the temperature-slope d(InT)/d(Int) plot of FIG. 9B, the initial temperature slope has magnitudes lower than 0.5 which is due to the translucency of the TBC coat. Again, it is seen that a filter with 2 borosilicate windows removed the infrared radiation from the residual heat of the hot flash tubes after flash. However, temperature-slope curves obtained using filters with 6 and 7 borosilicate windows are converged in the entire pulsed thermal imaging period, indicating that 6 windows are needed to extinct the infrared radiation in this test. Therefore, an infrared filter with 6 borosilicate windows should be used when conducting pulsed thermal imaging for translucent TBC (and oxide ceramic) samples. From the above Table 1, a filter with 6 borosilicate windows transmits 60% of visible light energy that is used for sample heating, and $<3\times10^{-10}$ of mid-infrared-wavelength (3-5 μm) radiation.

The third sample is a nickel-alloy plate of 2 mm thick with TBC coating on the back surface. This sample represents a typical metal with an opaque and high reflection surface.

Figure 10A:
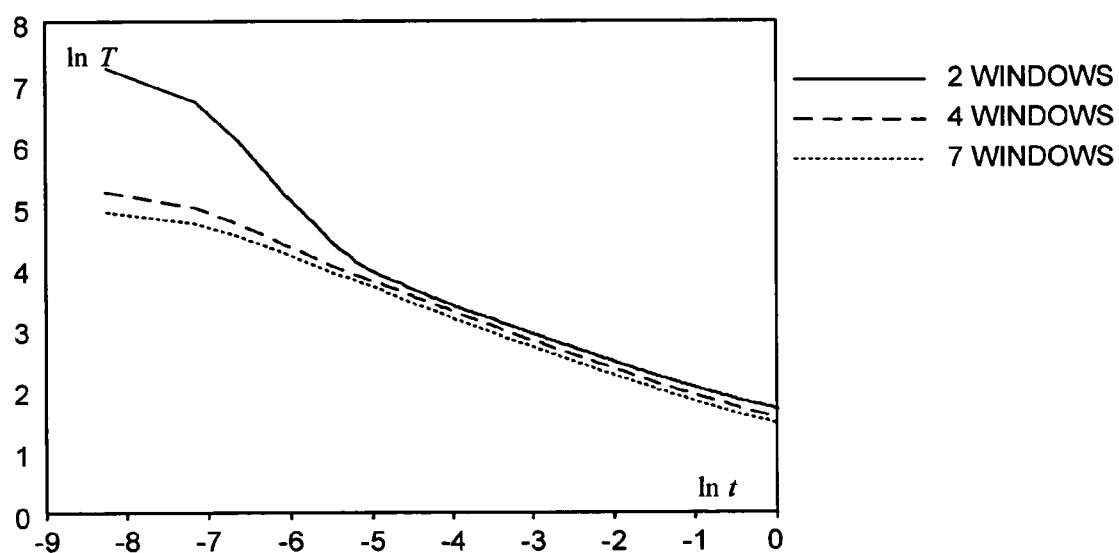
FIGS. 10A and 10B are graphs illustrating the effect of using infrared filters made with 2, 4, and 7 borosilicate windows on measured surface temperature and temperature slope as functions of time in log-log scale for a metallic sample in accordance with the preferred embodiment.
Figure 10B:
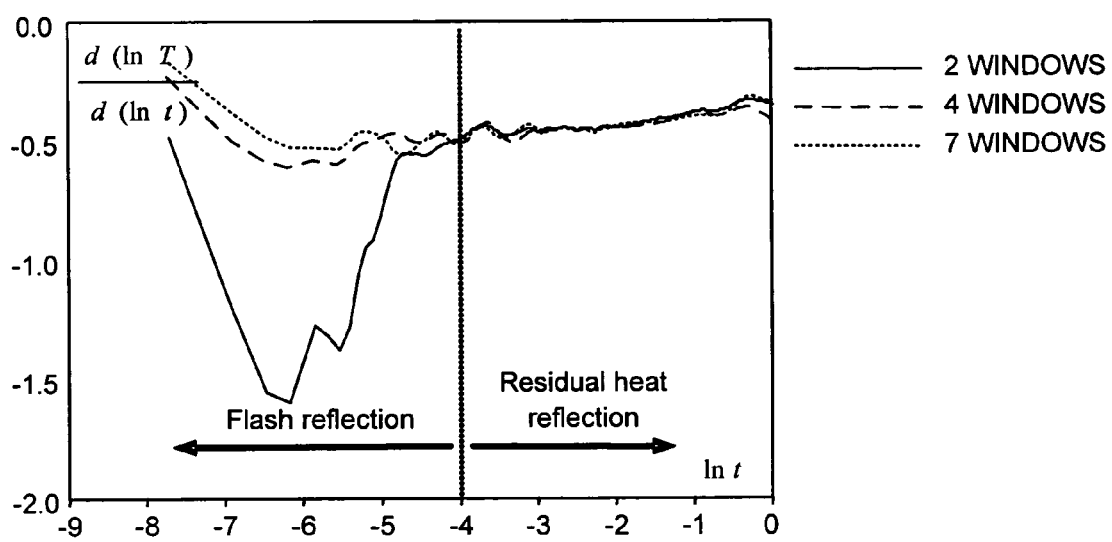

FIGS. 10A and 10B show the effect of using infrared filters made with 2, 4, and 7 borosilicate windows on measured surface temperature and temperature slope as functions of time in log-log scale for the metallic sample. Again, all temperature-slope d(InT)/d(Int) curves converge after 18 ms from the flash, indicating that a filter with 2 borosilicate windows removed the residual-heat infrared radiation. The temperature-slope d(InT)/d(Int) curves obtained with 4 and 7 windows have slight differences within the flash period (0-18 ms), possibly due to measurement noise. Nevertheless, it is apparent that an infrared filter with 6 borosilicate windows should be sufficient to eliminate infrared radiation from flash lamps when testing metal samples that are opaque but have high surface reflectivity.

In summary, for pulsed thermal imaging of materials, an infrared filter 102 made from 4 borosilicate windows is sufficient to extinct the infrared radiation from flash lamps 104 for black-opaque samples that have low reflections; a filter 102 made from 6 borosilicate windows is sufficient for all other high-reflection materials including translucent TBC, oxide ceramics, and metals. A filter 102 with 4 borosilicate windows transmits >71% of visible light energy that is used for sample heating, and <4×10⁻⁷ of mid-infrared-wavelength (3-5 μm) radiation which is the source of camera saturation and data inaccuracy. A filter 102 with 6 borosilicate windows transmits >60% of visible light energy, and <3×10⁻¹⁰ of mid-infrared-wavelength (3-5 μm) radiation. With this filter 102, all materials can be directly tested without the need of surface treatment such as surface paint. In addition, the filter 102 allows for accurate measurement of the complete thermal imaging data in during and after the flash period; thermal response within short period is essential for analyzing thin or high-conductivity materials. This filter 102 can also be used for pulsed thermal imaging by long-wavelength (8-14 μm) infrared cameras.

While the present invention has been described with reference to the details of the embodiments of the invention shown in the drawing, these details are not intended to limit the scope of the invention as claimed in the appended claims.

What is claimed is:

1. An optical filter for flash lamps used in pulsed thermal imaging comprising:
   at least one optical filter member,
   said at least one optical filter member substantially covering a flash lamp; and
   said at least one optical filter member including a stack of multiple plates; said at least one optical filter member being formed of a selected filter material having predefined optical properties and forming said stack of multiple plates for allowing visible wavelengths to penetrate while substantially blocking infrared wavelengths, said blocked infrared wavelengths being in a predefined spectrum band range of an infrared camera, said blocked infrared wavelengths being blocked by said selected filter material forming said stack of multiple plates of said at least one optical filter member in both a flash period and a residual heat period for the flash lamp, said selected filter material forming said at least one optical filter member enabling substantially complete data obtained in a thermal imaging test to be usable and accurate, without errors introduced by flash reflection effect and residual heating effect.

2. An optical filter as recited in claim 1 wherein said at least one optical filter member is made from said selected filter material of a group consisting of a borosilicate optical material, a heat absorbing glass, and sapphire.

3. An optical filter as recited in claim 1 wherein said at least one optical filter member substantially eliminates infrared radiation from the flash lamp to allow for accurate detection of surface temperature during entire pulsed thermal imaging tests.

4. An optical filter as recited in claim 1 wherein said at least one optical filter member including said stack of multiple plates includes a 6.5 mm thick borosilicate optical window.

5. An optical filter as recited in claim 4 wherein said 6.5 mm thick borosilicate optical window provides an optical transmission of greater than 92% in the visible wavelengths, and less than 2.5% in the infrared 3-5 micron wavelengths.

6. An optical filter as recited in claim 1 wherein said blocked infrared wavelengths within said predefined spectrum band range of an infrared camera include a range of 3-5 micron wavelengths.

7. An optical filter as recited in claim 1 wherein said blocked infrared wavelengths within said predefined spectrum band range of an infrared camera include a range of 8-14 micron wavelengths.

8. An optical filter as recited in claim 1 wherein said at least one optical filter member includes a stack of 6.5 mm thick borosilicate optical windows.

9. An optical filter as recited in claim 8 wherein said stack includes a maximum of seven of said 6.5 mm thick borosilicate optical windows.

10. An optical filter for flash lamps used in pulsed thermal imaging comprising:
    at least one optical filter member, said at least one optical filter member including a stack of multiple windows made from a borosilicate optical material;
    said at least one optical filter member substantially covering a flash lamp; and
    said at least one optical filter member member being formed of said borosilicate optical material having predefined optical properties and forming said stack of multiple windows for allowing visible wavelengths to penetrate while substantially blocking infrared wavelengths, said blocked infrared wavelengths being in a predefined spectrum band range of an infrared camera, said blocked infrared wavelengths being blocked by said borosilicate optical material forming said stack of multiple windows of said at least one optical filter member in both a flash period and a residual heat period for the flash lamp, said borosilicate optical material forming said stack of multiple windows of said at least one optical filter member allowing substantially complete data obtained in a thermal imaging test to be usable and accurate, without errors introduced by flash reflection effect and residual heating effect.

11. An optical filter as recited in claim 10 wherein said at least one optical filter member includes said stack of 6 plates made from said borosilicate optical material.

12. An optical filter as recited in claim 11 wherein said at least one optical filter member reduces the infrared radiation from a flash by greater than 9 orders of magnitude, while the flash energy in the visible wavelengths is decreased by less than 40%.

13. An optical filter for flash lamps used in pulsed thermal imaging comprising:
    at least one optical filter member, said at least one optical filter member being made from a borosilicate optical material;
    said at least one optical filter member including a stack of multiple plates and substantially covering a flash lamp; and
    said at least one optical filter member being formed of said borosilicate optical material having predefined optical properties and forming said stack of multiple plates for allowing visible wavelength to penetrate while substantially blocking infrared wavelengths, said blocked infrared wavelengths being in a predefined spectrum band range of an infrared camera including a range of 8-14 micron wavelengths, said blocked infrared wavelengths being blocked by said borosilicate optical material forming said stack of multiple plates of said at least one optical filter member in both a flash period and a residual heat period for the flash lamp, said selected filter material forming said stack of multiple plates of said at least one optical filter member allowing substantially complete data obtained in a thermal imaging test to be usable and accurate, without errors introduced by flash reflection effect and residual heating effect.

* * * * *